United States Patent
Yang et al.

(10) Patent No.: US 9,958,575 B2
(45) Date of Patent: May 1, 2018

(54) NEAR-INFRARED RAY SHIELDING FILM, A METHOD THEREOF, AND A COMPOSITION THEREOF

(71) Applicant: ZIRCO APPLIED MATERIALS CO., LTD., Taoyuan County (TW)

(72) Inventors: Shiou-Sheng Yang, Taoyuan County (TW); Ming-Te Lai, Taoyuan County (TW)

(73) Assignee: Zirco Applied Materials Co., Ltd., Zhongli, Taoyuan County (TW)

( * ) Notice: Subject to any disclaimer, the term of this patent is extended or adjusted under 35 U.S.C. 154(b) by 283 days.

(21) Appl. No.: 14/548,743

(22) Filed: Nov. 20, 2014

(65) Prior Publication Data
US 2015/0362627 A1    Dec. 17, 2015

(30) Foreign Application Priority Data
Jun. 11, 2014 (TW) .............................. 103120233 A

(51) Int. Cl.
*C08J 5/18* (2006.01)
*B29C 47/00* (2006.01)
(Continued)

(52) U.S. Cl.
CPC .......... *G02B 1/04* (2013.01); *B29D 11/00788* (2013.01); *C08J 5/18* (2013.01);
(Continued)

(58) Field of Classification Search
CPC .... G02B 1/04; G02B 5/208; C08J 5/18; C08J 2367/02; B29D 11/00788;
(Continued)

(56) References Cited

U.S. PATENT DOCUMENTS 5,310,591 A * 5/1994 Dodge ................ B41M 5/5254
428/195.1
5,434,000 A * 7/1995 Konagaya .................. C08J 5/18
428/323

(Continued)

FOREIGN PATENT DOCUMENTS

CN    1745149 A    3/2006
EP    2151468 A1   2/2010
(Continued)

OTHER PUBLICATIONS

Palzer, G., "Establishment of a standard test procedure for PET bottle materials with respect to chemical inertness behaviour including the preparation of a certified PET reference material", Ph.D. thesis, Nov. 19, 2001, Wissenschaftszentrum Weihenstephan für Ernährung, Landnutzung und Umwelt der Technischen Universität München Department für Lebensmittel und Ernährung Fachgebiet Haushalts-und; Betriebshygiene, Germany; 2 pgs.

(Continued)

*Primary Examiner* — Jeffrey Wollschlager
(74) *Attorney, Agent, or Firm* — Muncy, Geissler, Olds & Lowe, P.C.

(57) ABSTRACT

A method of manufacturing a near-infrared ray shielding film is disclosed. The method comprises: providing a raw material of PET; providing tungsten oxides-containing nanoparticles; blending the raw material of PET and the tungsten oxides-containing nanoparticles to obtain a polyester mixture with 80-99.99 wt % of the raw material of PET and 0.01-20 wt % of the tungsten oxides-containing nanoparticles; rolling the polyester mixture to obtain a polyester sheet; and biaxially-orientating the polyester sheet with a orientating rate of 1-100 meters per minute at 60-300° C.

2 Claims, 1 Drawing Sheet

(51) Int. Cl.
*G02B 1/04* (2006.01)
*G02B 5/20* (2006.01)
*B29D 11/00* (2006.01)
*B29K 67/00* (2006.01)
*B29K 509/02* (2006.01)
*B29C 55/00* (2006.01)
*B29K 105/16* (2006.01)
*C08K 3/22* (2006.01)

(52) U.S. Cl.
CPC .......... *G02B 5/208* (2013.01); *B29C 47/0004* (2013.01); *B29C 47/0057* (2013.01); *B29C 55/005* (2013.01); *B29K 2067/003* (2013.01); *B29K 2105/162* (2013.01); *B29K 2509/02* (2013.01); *B29K 2995/0011* (2013.01); *C08J 2367/02* (2013.01); *C08K 2003/2258* (2013.01)

(58) Field of Classification Search
CPC ...... C08K 2003/2258; B29K 2067/003; B29K 2509/02; B29K 2995/0011; B29K 2105/162; B29C 55/005; B29C 47/0004; B29C 47/0057
See application file for complete search history.

(56) References Cited

U.S. PATENT DOCUMENTS

| | | | |
|---|---|---|---|
| 5,714,110 A * | 2/1998 | Wang | A61M 25/0045 264/529 |
| 8,083,847 B2 | 12/2011 | Takeda et al. | |
| 8,202,927 B2 | 6/2012 | Hiwatashi | |
| 8,470,212 B2 | 6/2013 | Tofuku | |
| 8,613,829 B2 | 12/2013 | Anderson et al. | |
| 2003/0186040 A1* | 10/2003 | Oya | C08J 5/18 428/304.4 |
| 2004/0028924 A1* | 2/2004 | Kubota | B32B 27/36 428/480 |
| 2006/0110557 A1 | 5/2006 | Xia et al. | |
| 2007/0273964 A1* | 11/2007 | Oya | B32B 27/08 359/359 |
| 2008/0116426 A1* | 5/2008 | Adachi | B29C 66/73117 252/582 |
| 2009/0127741 A1* | 5/2009 | Kurouji | B29C 55/143 264/291 |
| 2010/0129630 A1* | 5/2010 | Fujita | B32B 27/20 428/220 |
| 2010/0261037 A1* | 10/2010 | Fujita | C08J 3/226 428/702 |
| 2011/0214720 A1* | 9/2011 | Hashimoto | B29C 47/0021 136/252 |
| 2014/0213753 A1* | 7/2014 | Bashir | B29C 43/003 528/308.1 |

FOREIGN PATENT DOCUMENTS

| | | |
|---|---|---|
| EP | 2206738 A1 | 7/2010 |
| JP | 2002240120 A | 8/2002 |
| JP | 2004211043 A | 7/2004 |
| JP | 2008024902 A | 2/2008 |
| JP | 2010079145 A | 4/2010 |
| JP | 2011026440 A | 2/2011 |
| JP | 2012082328 A | 4/2012 |
| TW | 242179 | 3/1995 |
| WO | WO 2005/014270 A3 | 2/2005 |

OTHER PUBLICATIONS

"PET Preform Injection Molding", KenPlas, Plastics Projects, Mar. 17, 2014, [retrieved from internet on Apr. 27, 2016] URL:https://web.archive.org/web/20140317233334/http://www.kenplas.com/project/pet/petinj.aspx; 4 pgs.

"Plastics Drying", Plastics Technology, Knowledge Center, Jun. 5, 2014, [retrieved from internet on May 11, 2016] URL:https://web.archive.org/web/20140605023656/http://www.ptonline.com/knowledgecenter/Plastics-Drying/Resin-Types/Crystalline-vs-Amorphous-PET; 2 pgs.

"Polyethylene terephthalate", Wikipedia, Feb. 10, 2013, [retrieved from the Internet on Nov. 18, 2016] URL:https://en.wikipedia.org/wiki/Polyethylene_terephthalate; 7 pgs.

Honma Seiichi, "Strength and Durability of Plastics", Plastics, Apr. 1, 2004, vol. 55 No. 4, p. 143-152, Japanese Industrial Committee Corp. Ltd., Japan; 11 pgs.

* cited by examiner

NEAR-INFRARED RAY SHIELDING FILM, A METHOD THEREOF, AND A COMPOSITION THEREOF

BACKGROUND OF THE INVENTION

1. Field of the Invention

The present invention generally relates to a film and, more particularly, to a near-infrared ray shielding film. The present invention also relates to a method of manufacturing the near-infrared ray shielding film and a composition for shielding near-infrared ray.

2. Description of the Related Art

Sunlight given off by the sun includes 5% of ultraviolet light, 43% of visible light and 52% of infrared light of the total electromagnetic radiation, respectively. Visible light-including sunlight is imported inside to meet the demands of lighting. However, the accompanied infrared light imported inside is the major reason of increasing indoor temperature.

For energy conservation and carbon reduction, a commercially available conventional near-infrared ray shielding film is provided. The conventional near-infrared ray shielding film with a decreased solar direct transmittance still poses a remained transmittance of visible lights, maintaining the indoor lighting and blocking infrared light being the major reason of increasing indoor temperature, thereby preventing indoor temperature from increasing. The methods of manufacturing the conventional near-infrared ray shielding film can be divided into the following:

In the first conventional method, the conventional near-infrared ray shielding film is obtained by binding to the surfaces of a transparent resin film via depositing metals or metal oxides. However, the requirement of deposition equipment with high vacuum quality and high precision raises the production cost of the conventional near-infrared ray shielding film and therefore, the conventional near-infrared ray shielding film are not in common use.

In the second conventional method, the conventional near-infrared ray shielding film is obtained via providing a paint including resins mixed with nanoparticles of metal oxides or hexaborides by wet coating method, followed by coating the paint onto the surfaces of a transparent resin film via slot extrusion, spray coating or soak coating. The paint and the transparent resin film belong to different materials and combination of the paint and the transparent resin film by coating may easily result in poor binding at the boundary between the paint and the transparent resin film. Therefore, the conventional near-infrared ray shielding film has a poor durability and the paint is easily peeled off from the transparent resin film.

In the third conventional method, the conventional near-infrared ray shielding film is directly shaping by a polyester mixture forming by dispersing microparticles of hexaborides, indium tin oxides or antimony tin oxides in polycarbonate resins or acrylic resins. Accordingly, the third conventional method shows decreased production cost and time. However, although the conventional near-infrared ray shielding film poses the transmittance of visible light of about 70%, the solar direct transmittance shows a high value merely about 50%.

In light of this, it is necessary to improve the conventional composition for shielding near-infrared ray, the conventional near-infrared ray shielding film and the conventional method of manufacturing the near-infrared ray shielding film.

SUMMARY OF THE INVENTION

It is therefore the objective of this invention to provide a composition for shielding near-infrared ray which poses an improving effect on shielding near-infrared ray and an improving adiabatic property.

It is another objective of this invention to provide a near-infrared ray shielding film with an improving effect on shielding near-infrared ray and an improving adiabatic property.

It is yet another objective of this invention to provide a near-infrared ray shielding film with a decreased production costs.

It is also another objective of this invention to provide a near-infrared ray shielding film an improved durability.

It is another objective of this invention to provide a method of manufacturing the near-infrared ray shielding film, being able to produce the near-infrared ray shielding film with an improving effect on shielding near-infrared ray and an improving adiabatic property.

It is yet another objective of this invention to provide a method of manufacturing the near-infrared ray shielding film, being able to produce the near-infrared ray shielding film with a decreased production costs.

It is also another objective of this invention to provide a method of manufacturing the near-infrared ray shielding film, being able to produce the near-infrared ray shielding film with an improved durability.

One embodiment of the invention discloses a composition for shielding near-infrared ray comprising: 80-99.99 wt % of PET (polyethylene terephthalate), and 0.01-20 wt % of a tungsten oxides-containing nanoparticle.

In a preferred form shown, the tungsten oxides-containing nanoparticle is selected from a group consisting of a nanoparticle of tungsten oxides and a nanoparticle of tungsten bronzes.

In a preferred form shown, the nanoparticle of tungsten oxides is represented by a formula $WO_x$, wherein W represents tungsten, O represents oxygen, and x is a number satisfying requirements $2.2 \leq x \leq 3$.

In a preferred form shown, the nanoparticle of tungsten bronzes is represented by a formula $A_y WO_z$, wherein A represents at least one chemical elements selected from main group elements, W represents tungsten, O represents oxygen, and y and z are numbers satisfying requirements $0.01 \leq y \leq 1$ and $2.2 \leq z \leq 3$, respectively.

In a preferred form shown, the nanoparticle of tungsten oxides is represented by a formula $WO_{2.72}$, wherein W represents tungsten, O represents oxygen.

In a preferred form shown, A represents at least one chemical elements selected form lithium, sodium, potassium, rubidium, cesium, magnesium, calcium, strontium, barium, aluminum, gallium, carbon, silicon, tin, antimony, fluorine, chlorine, bromine or iodine.

In a preferred form shown, the nanoparticle of tungsten bronzes is represented by a formula $Cs_{0.33}WO_3$, wherein Cs represents cesium, W represents tungsten, O represents oxygen.

In a preferred form shown, the tungsten oxides-containing nanoparticle are particles between 1 and 800 nm in size.

Another embodiment of the invention discloses a near-infrared ray shielding film comprising: a PET film comprising PET, and a plurality of tungsten oxides-containing nanoparticles which spread and mounted in the PET film; wherein the near-infrared ray shielding film comprises 80-99.99 wt % of PET and 0.01-20 wt % of the tungsten oxides-containing nanoparticle.

In another preferred form shown, the near-infrared ray shielding film has a density of the tungsten oxides-containing nanoparticle being 0.01-10 gram per square meter of the PET film.

In another preferred form shown, the near-infrared ray shielding film has a thickness of 1-1000 μm.

In another preferred form shown, the tungsten oxides-containing nanoparticle is selected from a group consisting of a nanoparticle of tungsten oxides and a nanoparticle of tungsten bronzes.

In another preferred form shown, the nanoparticle of tungsten oxides is represented by a formula $WO_x$, wherein W represents tungsten, O represents oxygen, and x is a number satisfying requirements $2.2 \leq x \leq 3$.

In another preferred form shown, the nanoparticle of tungsten bronzes is represented by a formula $A_yWO_z$, wherein A represents at least one chemical elements selected from main group elements, W represents tungsten, O represents oxygen, and y and z are numbers satisfying requirements $0.01 \leq y \leq 1$ and $2.2 \leq z \leq 3$, respectively.

In another preferred form shown, the nanoparticle of tungsten oxides is represented by a formula $WO_{2.72}$, wherein W represents tungsten, O represents oxygen.

In another preferred form shown, A represents at least one chemical elements selected form lithium, sodium, potassium, rubidium, cesium, magnesium, calcium, strontium, barium, aluminum, gallium, carbon, silicon, tin, antimony, fluorine, chlorine, bromine or iodine.

In another preferred form shown, the nanoparticle of tungsten bronzes is represented by a formula $Cs_{0.33}WO_3$, wherein Cs represents cesium, W represents tungsten, O represents oxygen.

In another preferred form shown, the tungsten oxides-containing nanoparticle are particles between 1 and 800 nm in size.

The other embodiment of the invention discloses a method of manufacturing a near-infrared ray shielding film comprising: providing a raw material of PET; providing a tungsten oxides-containing nanoparticle; blending the raw material of PET and the tungsten oxides-containing nanoparticles at 180-360° C. to obtain a polyester mixture with 80-99.99 wt % of the raw material of PET and 0.01-20 wt % of the tungsten oxides-containing nanoparticles; extruding or compression molding the polyester mixture to obtain a polyester sheet; and uniaxially- or biaxially-orientating the polyester sheet with a orientating rate of 1-100 meters per minute at 60-300° C.

In also another preferred form shown, an additive selected from a group consisting of UV protective agents, light stabilizers, durability-improving agents, anti-hydrolysis-improving agents, heat resistant agents, lubricants and crystallinity-improving agents is further added to the raw material of PET before blending the raw material of PET and the tungsten oxides-containing nanoparticles.

In also another preferred form shown, the tungsten oxides-containing nanoparticle is selected from a group consisting of a nanoparticle of tungsten oxides and a nanoparticle of tungsten bronzes.

In also another preferred form shown, the nanoparticle of tungsten oxides is represented by a formula $WO_x$, wherein W represents tungsten, O represents oxygen, and x is a number satisfying requirements $2.2 \leq x \leq 3$.

In also another preferred form shown, the nanoparticle of tungsten bronzes is represented by a formula $A_yWO_z$, wherein A represents at least one chemical elements selected from main group elements, W represents tungsten, O represents oxygen, and y and z are numbers satisfying requirements $0.01 \leq y \leq 1$ and $2.2 \leq z \leq 3$, respectively.

In also another preferred form shown, the nanoparticle of tungsten oxides is represented by a formula $WO_{2.72}$, wherein W represents tungsten, O represents oxygen.

In also another preferred form shown, A represents at least one chemical elements selected form lithium, sodium, potassium, rubidium, cesium, magnesium, calcium, strontium, barium, aluminum, gallium, carbon, silicon, tin, antimony, fluorine, chlorine, bromine or iodine.

In also another preferred form shown, the nanoparticle of tungsten bronzes is represented by a formula $Cs_{0.33}WO_3$, wherein Cs represents cesium, W represents tungsten, O represents oxygen.

In also another preferred form shown, the tungsten oxides-containing nanoparticle are particles between 1 and 800 nm in size.

In also another preferred form shown, blending the raw material of PET and the tungsten oxides-containing nanoparticles at 200-320° C. by a single screw extruder or a twin screw extruder with a screw speed between 100 and 900 rpm.

In also another preferred form shown, rolling the polyester mixture at 30-100° C. by a casting drum or compression molding the polyester mixture at 180-350° C.

In also another preferred form shown, uniaxially- or biaxially-orientating the polyester sheet at 80-240° C.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

Figure 1:
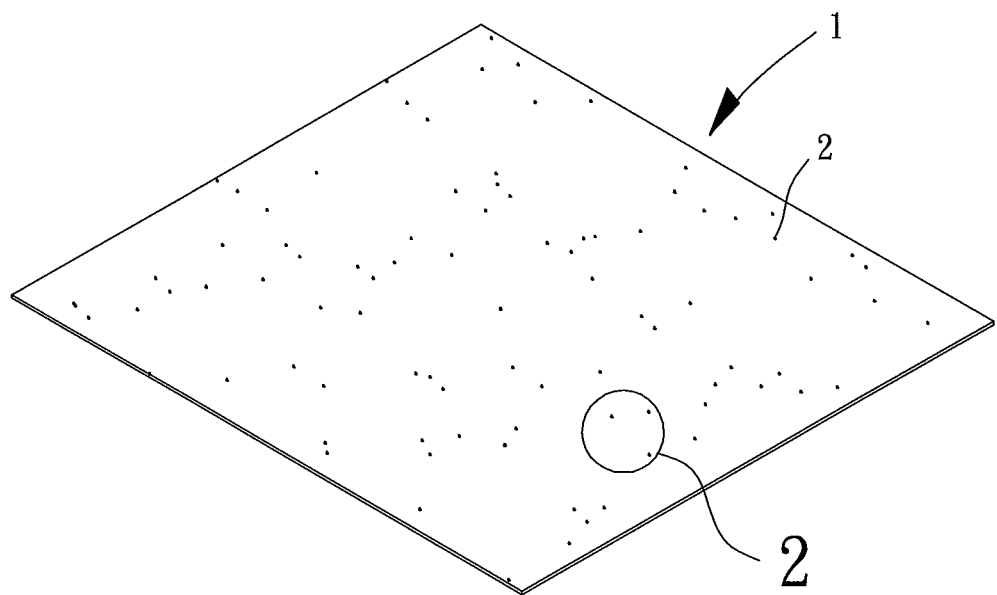
FIG. 1 is an outer appearance view of a near-infrared ray shielding film according to the invention.

In the various figures of the drawings, the same numerals designate the same or similar parts. Furthermore, when the term "first", "second", "third", "fourth", "inner", "outer", "top", "bottom" and similar terms are used hereinafter, it should be understood that these terms refer only to the structure shown in the drawings as it would appear to a person viewing the drawings, and are utilized only to facilitate describing the invention.

DETAILED DESCRIPTION OF THE INVENTION

The composition for shielding near-infrared ray according to the invention comprises 80-99.9 wt % of PET (poly ethylene terephthalate) and 0.01-20 wt % of a tungsten oxides-containing nanoparticle. The tungsten oxides-containing nanoparticle is selected from a group consisting of a nanoparticle of tungsten oxides and a nanoparticle of tungsten bronzes.

The tungsten oxides-containing nanoparticle are particles between 1 and 800 nm in size, and preferably, between 10 and 195 nm. The nanoparticle of tungsten oxides is represented by a formula $WO_x$, wherein W represents tungsten, O represents oxygen, and x is a number satisfying requirements $2.2 \leq x \leq 3$. Moreover, the nanoparticle of tungsten bronzes is represented by a formula $A_yWO_z$, wherein A represents at least one chemical elements selected from main group elements, W represents tungsten, O represents oxygen, and y and z are numbers satisfying requirements $0.01 \leq y \leq 1$ and $2.2 \leq z \leq 3$, respectively. Preferably, A represents at least one chemical elements selected form lithium, sodium, potassium, rubidium, cesium, magnesium, calcium, strontium, barium, aluminum, gallium, carbon, silicon, tin, antimony, fluorine, chlorine, bromine or iodine. The nanoparticle of tungsten bronzes can be represented by a formula selected form $Cs_{0.33}WO_3$, $K_{0.33}WO_3$, $K_{0.55}WO_3$, $Na_{0.5}WO_3$ or $Ba_{0.33}WO_3$. In the embodiment, the nanoparticle of tungsten oxides and the nanoparticle of tungsten bronzes are represented by formulas $WO_{2.72}$ and $Cs_{0.33}WO_3$, respectively.

Figure 2:
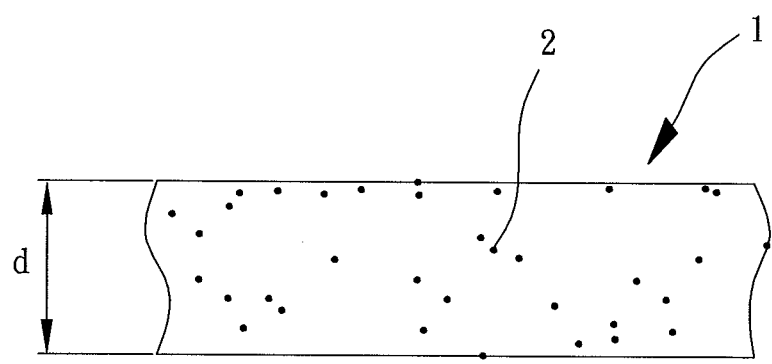
FIG. 2 is a cross-sectional, enlarged view of the near-infrared ray shielding film according to the invention.

The composition for shielding near-infrared ray comprises the tungsten oxides-containing nanoparticle poses effect on shielding near-infrared ray; thus, the composition for shielding near-infrared ray can be processed to form a near-infrared ray shielding film which can be broadly used to paste on the windows. Referring to FIGS. 1 and 2, the near-infrared ray shielding film comprises a PET film 1 and a plurality of tungsten oxides-containing nanoparticles 2. The plurality of tungsten oxides-containing nanoparticles 2 are spread and mounted in the PET film 1. The near-infrared ray shielding film comprises 80-99.99 wt % of PET and 0.01-20 wt % of the tungsten oxides-containing nanoparticle 2. The near-infrared ray shielding film has a thickness "d", and preferably, the thickness "d" is between 1 to 1000 μm.

In detail, as mentioned above, the tungsten oxides-containing nanoparticle can be selected from a group consisting of a nanoparticle of tungsten oxides and a nanoparticle of tungsten bronzes. The tungsten oxides-containing nanoparticle are particles between 1 and 800 nm in size, and preferably, between 10 and 195 nm. The nanoparticle of tungsten oxides is represented by a formula $WO_x$, wherein W represents tungsten, O represents oxygen, and x is a number satisfying requirements $2.2 \leq x \leq 3$. Moreover, the nanoparticle of tungsten bronzes is represented by a formula $A_yWO_z$, wherein A represents at least one chemical elements selected from main group elements, W represents tungsten, O represents oxygen, and y and z are numbers satisfying requirements $0.01 \leq y \leq 1$ and $2.2 \leq z \leq 3$, respectively. Preferably, A represents at least one chemical elements selected form lithium, sodium, potassium, rubidium, cesium, magnesium, calcium, strontium, barium, aluminum, gallium, carbon, silicon, tin, antimony, fluorine, chlorine, bromine or iodine. The nanoparticle of tungsten bronzes can be represented by a formula selected form $Cs_{0.33}WO_3$, $K_{0.33}WO_3$, $K_{0.55}WO_3$, $Na_{0.5}WO_3$ or $Ba_{0.33}WO_3$. In the embodiment, the nanoparticle of tungsten oxides and the nanoparticle of tungsten bronzes are represented by formulas $WO_{2.72}$ and $Cs_{0.33}WO_3$, respectively.

A method for manufacturing a near-infrared ray shielding film as mentioned before is also disclosed in the invention. The method comprises: providing a raw material of PET; providing a tungsten oxides-containing nanoparticle; blending the raw material of PET and the tungsten oxides-containing nanoparticles at 180-360° C. to obtain a polyester mixture with 80-99.99 wt % of the raw material of PET and 0.01-20 wt % of the tungsten oxides-containing nanoparticles; extrusing (extrusion molding) or compression molding the polyester mixture to obtain a polyester sheet; and uniaxially- or biaxially-orientating the polyester sheet with a orientating rate of 1-100 meters per minute at 60-300° C.

In detail, the raw material of PET includes PET. Preferably, before blending the raw material of PET and the tungsten oxides-containing nanoparticles, an additive selected from a group consisting of UV protective agents, light stabilizers, durability-improving agents, anti-hydrolysis-improving agents, heat resistant agents, lubricants and crystallinity-improving agents is further added to the raw material of PET. The additive can be benzophenone type (2-hydroxy-4-n-octyloxy-benzophenone, etc.), benzotriazole type (5-Methyl-1H-benzotriazole, etc.), triazine type (TRIMETHOXY-S-TRIAZINE, etc.), oxanilide type, hinder amine light stabilizer (Bis(2,2,6,6-tetramethyl-4-piperidyl)-sebacate, etc.), wax, salts, esters, amides of stearic acid, lead salts, organotin compounds, 2,6-di-tert-butyl-4-methylphenol. The tungsten oxides-containing nanoparticle is the same as mentioned before.

Then, the raw material of PET and the tungsten oxides-containing nanoparticle are blended at 180-360° C. to obtain the transparent polyester mixture. Preferably, the raw material of PET and the tungsten oxides-containing nanoparticle are blended at 200-340° C. In particular, the raw material of PET and the tungsten oxides-containing nanoparticle are blended by a single screw extruder or a twin screw extruder. Alternatively, the raw material of PET and the tungsten oxides-containing nanoparticle are blended by a Brabender. If the raw material of PET and the tungsten oxides-containing nanoparticle are blended by the twin screw extruder, the screw rotating speed is 50-950 rpm. If the raw material of PET and the tungsten oxides-containing nanoparticle are blended by the Brabender, the rotating speed is 10-100 rpm.

In the embodiment, the raw material of PET and the tungsten oxides-containing nanoparticle are blended by the twin screw extruder at 240-330° C. with the screw rotating speed of 100-900 rpm. Because of the high shearing force of the twin screw extruder, the raw material of PET and the tungsten oxides-containing nanoparticle can be kneaded, plasticized, sheared and homogenized, and therefore the raw material of PET and the tungsten oxides-containing nanoparticle can be uniformly blended.

The polyester sheet is further obtained by extrusing (extrusion molding) or compression molding the polyester mixture. The polyester mixture can be rolled by a casting drum, and therefore the polyester sheet with uniform thickness can be obtained. The polyester mixture can be rolled at 30-180° C., preferably at 50-150° C. In the embodiment, the polyester mixture extruded form the twin screw extruder can be rolled at 30-100° C. by the casting drum to obtain the polyester sheet. Alternatively, a strip-like product extruded from the twin screw extruder can be further cut to form granules. The formed granules can be compression molded at 180-350° C. to obtain the polyester sheet.

The temperature of the casting drum used in the embodiment is preferably lower than the glass transform temperature Tg of the raw material of PET, ensuring the polyester mixture can be quickly cooled down form melted status and thereby controlling the crystallization status of the raw material of PET of the polyester mixture. The higher the crystallization status is, the haze of the polyester mixture increases and the easier the obtained polyester sheet breaks.

The polyester sheet is uniaxially- or biaxially-orientated to obtain the near-infrared ray shielding film. The polyester sheet can be orientated along an orientating direction and obtained the near-infrared ray shielding film with an improved mechanical strength in the orientated direction. In detail, the polyester sheet is uniaxially- or biaxially-orientated at 60-300° C., and preferably at 80-280° C. with an orientating rate of 1-100 meters per minute. Besides, the biaxially-orientation can be continuous two-step extrusion or single-step synchronous extrusion. In the continuous two-step extrusion, the polyester sheet is vertically compression molded by a heated drum, followed by horizontally extrusion in an oven. In the embodiment, the biaxially-orientation is single-step synchronous extrusion using Bruchner KARO IV with a heated circulating motor with a rotating speed of 800-3000 rpm. By using the heated circulating motor, the polyester sheet is biaxially-orientation with the orientating rate of 1-100 meters per minute at 80-240° C.

with the orientating fold between 1 and 9, to obtain the near-infrared ray shielding film with a preferable thickness of 1-1000 μm.

Preferably, the near-infrared ray shielding film can be heat treated to release the remained internal stress after rolling and biaxially-orientation, such as decreasing the thermal shrinkage rate of the near-infrared ray shielding film. The heat treatment is performed at 60-300° C., and preferably at 80-280° C. for 1-120 minutes. In the embodiment, the heat treatment is performed at 100-240° C. for 1-60 minutes.

Preferably, before blending, the raw material of PET can be dried to remove water inside, preventing the raw material of PET from degradation in the manufacturing process. The raw material of PET can be dried until the water content below 30 ppm by circulating airflow drying method, heating drying method or vacuum drying method. For example, in the circulating airflow drying method, the raw material of PET is kept at 110-160° C. for 60 minutes, followed by keeping at 170-190° C. for 3-12 hours. Moreover, in the vacuum drying method, the raw material of PET is kept at 120-150° C. for 6-12 hours. Furthermore, the tungsten oxides-containing nanoparticle also can be dried before blending. By the drying process, the quality of the obtained near-infrared ray shielding film can be improved, preventing from the hazing problem due to water vapor accumulation.

That is, the near-infrared ray shielding film can be obtained via low-cost blending, extruding and rolling devices, thereby decreasing the production cost of the near-infrared ray shielding film. Besides, the tungsten oxides-containing nanoparticles with effect on shielding near-infrared ray uniformly separates inside, thereby preventing from the poor binding at the boundary and further extending the durability of the near-infrared ray shielding film. Moreover, the near-infrared ray shielding film with the tungsten oxides-containing nanoparticles manufactured by a proper method poses a better effect on shielding near-infrared ray.

In order to evaluate the near-infrared ray shielding film of the invention poses the better effect on shielding near-infrared ray, and to demonstrate the near-infrared ray shielding film poses the best effect on shielding near-infrared ray, the near-infrared ray shielding films of groups A1 to A7 obtained using different parameters including temperature and time of drying the raw material of PET, composition and the particle size of the tungsten oxides-containing nanoparticle, weight of the raw material of PET per square meter of the final product, rotating speed of the screw, the depth of the polyester sheet, temperature of rolling, temperature of compression molding, temperature, orientating speed, orientating fold of biaxially-orientating, temperature of heat treatment, depth of the near-infrared ray shielding film. The near-infrared ray shielding film without the tungsten oxides-containing nanoparticle named group A0 is used as a control.

Before blending, the tungsten oxides-containing nanoparticles are vacuum drying at 80° C. for 12 hours. The blending is performed at 240-330° C. The rotating speed of the heated circulating motor of Bruchner KARO IV is set at 1700 rpm. The detailed parameters are listed in TABLE 1. The weight of the tungsten oxides-containing nanoparticle per square meter of the final product is calculated as following: weight of the weight of the tungsten oxides-containing nanoparticle (gram) divided by the area of the near-infrared ray shielding film ($m^2$).

TABLE 1

| | Group A0 | Group A1 | Group A2 | Group A3 | Group A4 | Group A5 | Group A6 | Group A7 |
|---|---|---|---|---|---|---|---|---|
| PET drying temperature (° C.) | 110 | 110 | 110 | 110 | 80 | 80 | 80 | 80 |
| PET drying time (hour) | 12 | 12 | 12 | 12 | 12 | 12 | 12 | 12 |
| Composition of the tungsten oxides-containing nanoparticle | X | $Cs_{0.33}WO_3$ | $Cs_{0.33}WO_3$ | $WO_{2.72}$ | $Cs_{0.33}WO_3$ | $Cs_{0.33}WO_3$ | $Cs_{0.33}WO_3$ | $WO_{2.72}$ |
| Particle size of the tungsten oxides-containing nanoparticle (nm) | X | 68 | 68 | 72 | 68 | 68 | 68 | 68 |
| PET wt % | 0 | 99.14 | 99.14 | 99.14 | 98.92 | 82.14 | 99.96 | 99.91 |
| Tungsten oxides-containing nanoparticle (wt %) | 0 | 0.86 | 0.86 | 0.86 | 1.08 | 17.86 | 0.04 | 0.09 |

TABLE 1-continued

| | Group A0 | Group A1 | Group A2 | Group A3 | Group A4 | Group A5 | Group A6 | Group A7 |
|---|---|---|---|---|---|---|---|---|
| Weight of the tungsten oxides-containing nanoparticle per square meter of the final product (g/m$^2$) | 0 | 0.6 | 0.6 | 0.6 | 1.5 | 3 | 0.3 | 0.6 |
| Rotating speed of the screw (rpm) | 300-600 | 300-600 | 300-600 | 300-600 | 300-600 | 100-300 | 600-900 | 600-900 |
| Thickness of the polyester sheet (μm) | 450 | 50 | 450 | 450 | 400 | 90 | 2000 | 2000 |
| Temperature of rolling of compression molding (° C.) | 50-60 | X | 50-60 | 50-60 | 60-70 | 50-60 | 270-280 | 270-280 |
| Temperature of biaxially-orientating (° C.) | 160-165 | X | 160-165 | 160-165 | 170-195 | 160-165 | 190-215 | 190-215 |
| Orientating speed of biaxially-orientating (m/min) | 30 | X | 30 | 30 | 15 | 15 | 30 | 30 |
| Orientating fold of biaxially-orientating | 9 | X | 9 | 9 | 4 | 9 | 4 | 4 |
| Temperature of heat treatment (° C.) | 160-190 | 160-190 | 160-190 | 160-190 | 170-200 | 160-190 | 170-200 | 170-200 |
| Thickness of the near-infrared ray shielding film (μm) | 50 | 50 | 50 | 50 | 100 | 10 | 500 | 500 |

Referring to TABLE 1, the near-infrared ray shielding film of group A0 is made without the nanoparticles containing tungsten oxide. The only different parameter between groups A1 and A2 is the near-infrared ray shielding film of group is manufactured without biaxially-orientating, therefore, the thickness of the polyester sheet of group A1 is the same as the thickness of the near-infrared ray shielding film. Moreover, in groups A6 and A7, the rotation speed of the screw much higher than the others results in the granules-like polyester mixture, therefore, the high-temperature compression molding is used to form the polyester sheet.

The optical property of the near-infrared ray shielding film of groups A0 to A7 is shown in the following TABLE 2. The transmittance of visible light and sunlight are measured according to the standard ISO9050.

TABLE 2

| Group | Weight of the tungsten oxides-containing nanoparticle per square meter of the final product (g/m²) | Composition of the tungsten oxides-containing nanoparticle | Thickness of the near-infrared ray shielding film | Light transmittance | Solar direct transmittance |
|---|---|---|---|---|---|
| A0 | X | X | 50 | 89.1 | 88.9 |
| A1 | 0.6 | $Cs_{0.33}WO_3$ | 50 | 77.6 | 45.5 |
| A2 | 0.6 | $Cs_{0.33}WO_3$ | 50 | 78.2 | 45.7 |
| A3 | 0.6 | $WO_{2.72}$ | 50 | 74.8 | 59.1 |
| A4 | 1.5 | $Cs_{0.33}WO_3$ | 100 | 65.1 | 27.3 |
| A5 | 3 | $Cs_{0.33}WO_3$ | 10 | 45.8 | 13.7 |
| A6 | 0.3 | $Cs_{0.33}WO_3$ | 500 | 85.5 | 55.2 |
| A7 | 0.6 | $WO_{2.72}$ | 500 | 73.7 | 58.8 |

Referring to TABLE 2, compared to group A0, all of groups A1 to A7 shows apparently decreased level of the transmittance of visible light and sunlight. Moreover, the decreased level of the solar direct transmittance is higher than the decreased level of the transmittance of visible light. It is worthy to note that sunlight approximately includes 52% of infrared light, 43% of visible light and 5% of ultraviolet light. Therefore, it is understood that the higher decreased level of the solar direct transmittance than the decreased level of the transmittance of visible light indicates part of the decreased level of sunlight is due to the decreased level of the transmittance of infrared light. As a result, the addition of the tungsten oxides-containing nanoparticles poses the improved effect on shielding near-infrared ray of the near-infrared ray shielding film of groups A1 to A7. Moreover, the near-infrared ray shielding films of groups A2 and A3 with the transmittance of visible light higher than 70% and the solar direct transmittance lower than 50% pose the best effect on shielding near-infrared ray.

Moreover, the only different parameter between groups A2 and A3 is the composition and the particle size of the tungsten oxides-containing nanoparticle. That is, the tungsten oxides-containing nanoparticle used in group A2 is represented by the formula $Cs_{0.33}WO_3$ with the particle size of 68 nm, and the tungsten oxides-containing nanoparticle used in group A3 is represented by the formula $WO_{2.72}$ with the particle size of 72 nm. Therefore, according to the results shown in TABLE 2, on the circumstance of similar particle size, compared to the tungsten oxides-containing nanoparticle represented by the formula $WO_{2.72}$, the tungsten oxides-containing nanoparticle represented by the formula $Cs_{0.33}WO_3$ shows a better effect on shielding near-infrared ray.

Five of the near-infrared ray shielding films with size of 150 mm×10 mm are roasted at 150° C. for 30 minutes, followed by measuring the final size of the roasted near-infrared ray shielding films. The thermal shrinkage rate shown in TABLE 3 is calculated by dividing the mean value of the size of the roasted near-infrared ray shielding films by the mean value of the size of the near-infrared ray shielding films.

TABLE 3

| Group | Thermal shrinkage rate (%) |
|---|---|
| A2 | 5 |
| A3 | 1 |

Referring to TABLE 3, the near-infrared ray shielding film of group A2 without biaxially-orientating has a higher thermal shrinkage rate. As mentioned before, the near-infrared ray shielding film can be used to attach on transparent base material (i.e. glass). Therefore, the higher thermal shrinkage rate may result in easily peeling off from the transparent base material.

In conclusion, because of the addition of the tungsten oxides-containing nanoparticle with effect on shielding near-infrared ray, the composition for shielding near-infrared ray and the near-infrared ray shielding film of the invention pose the improved effect on shielding near-infrared ray, further improving the adiabatic property of the composition for shielding near-infrared ray and the near-infrared ray shielding film of the invention.

Moreover, the near-infrared ray shielding film of the invention comprises the plurality of tungsten oxides-containing nanoparticles which spread and mounted in the PET film, preventing from the problem of poor binding at the boundary, and thereby improving the durability of the near-infrared ray shielding film.

In addition, the near-infrared ray shielding film of the invention is made via low-cost blending, extruding and rolling devices, and therefore the production cost of the near-infrared ray shielding film can be decreased.

Although the invention has been described in detail with reference to its presently preferable embodiment, it will be understood by one of ordinary skill in the art that various modifications can be made without departing from the spirit and the scope of the invention, as set forth in the appended claims.

What is claimed is:

1. A method of manufacturing a near-infrared ray shielding film comprising:

drying a raw material of PET at 110° C. for 12 hours until the raw material of PET has a water content below 30 ppm; vacuum drying $Cs_{0.33}WO_3$ nanoparticles at 80° C. for 12 hours, wherein each of the $Cs_{0.33}WO_3$ nanoparticles has a size of 68 nm;

blending the dried raw material of PET and the dried $Cs_{0.33}WO_3$ nanoparticles at 240-330° C. by a twin screw extruder with a screw speed between 300 and 600 rpm to obtain a polyester mixture with 99.14 wt % of the raw material of PET and 0.86 wt % of the dried $Cs_{0.33}WO_3$ nanoparticles;

extruding the polyester mixture at 50-60° C. to obtain a polyester sheet; and biaxially orientating the polyester sheet with an orientating rate of 30 meters per minute at 160-165° C.

2. The method of manufacturing a near-infrared ray shielding film as claimed in claim 1, wherein an additive selected from a group consisting of UV protective agents, light stabilizers, durability-improving agents, anti-hydrolysis-improving agents, heat resistant agents, lubricants and crystallinity-improving agents is further added to the dried raw material of PET before blending the dried raw material of PET and the dried $Cs_{0.33}WO_3$ nanoparticles.

* * * * *